(12) United States Patent
Rumack

(10) Patent No.: US 8,328,278 B2
(45) Date of Patent: Dec. 11, 2012

(54) CHILD POSITIONING INSERT

(76) Inventor: Beth G. Rumack, Phoenix, AZ (US)

( * ) Notice: Subject to any disclaimer, the term of this patent is extended or adjusted under 35 U.S.C. 154(b) by 247 days.

(21) Appl. No.: 12/626,131

(22) Filed: Nov. 25, 2009

(65) Prior Publication Data

US 2010/0066138 A1 Mar. 18, 2010

Related U.S. Application Data

(63) Continuation-in-part of application No. 12/077,990, filed on Mar. 24, 2008, now Pat. No. 7,641,283.

(60) Provisional application No. 60/896,444, filed on Mar. 22, 2007.

(51) Int. Cl.
*A47C 7/46* (2006.01)

(52) U.S. Cl. ............ 297/219.12; 297/230.12; 297/284.7

(58) Field of Classification Search ............. 297/219.12, 297/250.1, 391, 410, 485
See application file for complete search history.

(56) References Cited

U.S. PATENT DOCUMENTS

| | | | |
|---|---|---|---|
| 514,189 A | 2/1894 | Harvey | |
| 1,001,312 A | 8/1911 | Sebring | |
| 4,161,337 A | 7/1979 | Ross et al. | |
| 4,440,443 A * | 4/1984 | Nordskog | 297/397 |
| 4,502,728 A | 3/1985 | Sheldon et al. | |
| 4,730,871 A | 3/1988 | Sheldon | |
| 4,779,930 A * | 10/1988 | Rosen | 297/464 |
| 5,064,245 A * | 11/1991 | Stephens | 297/397 |
| 5,308,028 A * | 5/1994 | Kornberg | 297/403 |
| 5,383,711 A * | 1/1995 | Houghteling | 297/397 |
| 5,829,829 A | 11/1998 | Celestina-Krevh | |
| 6,273,509 B1 * | 8/2001 | Reithmeier et al. | 297/410 |
| 6,467,840 B1 | 10/2002 | Verbovszky et al. | |
| 6,467,846 B2 * | 10/2002 | Clough | 297/410 |
| 6,485,101 B2 * | 11/2002 | Kassai et al. | 297/250.1 |
| 6,523,901 B2 * | 2/2003 | Smith | 297/392 |
| 6,929,325 B1 | 8/2005 | Goelo | |
| 6,957,861 B1 | 10/2005 | Chou et al. | |
| 7,311,357 B2 | 12/2007 | Gold et al. | |
| 7,448,686 B2 * | 11/2008 | Hersh | 297/397 |
| 2002/0014793 A1 | 2/2002 | Santha | |
| 2007/0096523 A1 | 5/2007 | Greene | |

* cited by examiner

*Primary Examiner* — Peter R. Brown
(74) *Attorney, Agent, or Firm* — Tiffany & Bosco, P.A.

(57) ABSTRACT

A child positioning insert including a frame with a first column and a second column, where the first and second columns are positioned vertically. The first column has a first guide and the second column has a second guide, where the first and second guides extend along a portion of the length of each column. A shoulder roll connects to the frame via the first column and the second column, so that the shoulder roll is perpendicular to the first column and the second column. The shoulder roll has a backing that connects to the first guide and to the second guide such that the backing can move vertically along the first and second guides. A head support member connects to the frame in a position above the frame and above the shoulder roll, so that the head support member includes a first support member to substantially prevent lateral motion of a person's head in a first direction and a second support member to substantially prevent lateral motion of the person's head in a second direction.

20 Claims, 12 Drawing Sheets

CHILD POSITIONING INSERT

CROSS-REFERENCE TO RELATED APPLICATION(S)

This application is a Continuation-In-Part application of U.S. application Ser. No. 12/077,990 now U.S. Pat. No. 7,641,283 (filed Mar. 24, 2008 and entitled Infant Positioning Seat Insert, which claims priority to and the benefit of provisional application No. 60/896,444 filed Mar. 22, 2007).

FIELD OF INVENTION

This invention relates to infant and child safety devices. This invention relates particularly to an insert to support an infant or child in a position that provides a clear airway and prevents compromise of that airway and otherwise supports the head and neck of the infant or child.

BACKGROUND

Compared to an adult human, an infant's parietal and occipital bones are disproportionate to the rest of the skull, resulting in an enlarged back of the head. When laid flat or positioned in a seat, the back of the infant's head contacts a surface in advance of its shoulders. The infant's head is pushed forward and downward, allowing the infant's pencil-sized airway to be easily compromised, putting the infant at risk for suffocation, apnea, oxygen desaturation episodes, bradycardia, and other dangerous conditions resulting from restricted breathing.

Parents use car seats to protect their infants in the event of a car accident. The angle of a car seat is specifically designed for crash safety to minimize the impact on the infant. The angle needed to maintain the safety of a regular-sized infant in a car accident places preterm and term infants at risk for airway compromise. Further, infants tend to slouch in car seats due to excessive room between the infant's crotch and center car seat strap, potentially causing airway compromise. Excess room on the sides of the infant allows shifting of the head, body, or both, sideways in the seat, which also may restrict the airway.

If the parents recognize the danger to the infant, they may attempt to pad the excess room using blankets, towels, or other space-fillers in order to keep the infant in place in the seat. This makeshift solution is potentially dangerous: the parents cannot be sure they are creating a safe environment for the infant and may be compromising the safety features of the car seat. Several patented solutions address the empty space in the seat, but do not resolve the airway restriction caused by the infant's enlarged head. A device that fills the dangerous empty space, supports the infant's head in a natural position, adjusts to the size of the infant, and does not affect the safety features of the infant seat is needed. Such a device can be extrapolated in size to fit a toddler or other child.

Therefore, it is an object of this invention to provide an infant or child positioning or seat insert that can be used in standard infant seats or other child seats to prevent an infant's airway from becoming compromised and stabilize the child in the seat or other device. It is a further object that the insert be adjustable to accommodate any size infant, toddler, or other child. It is a further object that the insert not affect the safety features of the infant seat or other child seat.

SUMMARY OF THE INVENTION

Exemplary embodiments of the present invention include a system, method, and apparatus such as:

A device including a frame including a first column and a second column, where the first and second columns are positioned vertically; a first guide coupled to the first column and a second guide coupled to the second column, where the first and second guides extend along at least a portion of the length of each column; a shoulder roll coupled to the frame via the first column and the second column, where the shoulder roll is perpendicular to the first column and the second column, where the shoulder roll further includes a backing that couples to the first guide and to the second guide such that the backing can move vertically along the first and second guides; and a head support member coupled to the frame in a position above the frame and above the shoulder roll, where the head support member includes a first support member to substantially prevent lateral motion of a person's head in a first direction and a second support member to substantially prevent lateral motion of the person's head in a second direction.

The device above where the head support member is in the shape of at least one of a semicircle, a U, a V, and a partial cylinder.

The device above where the head support member substantially prevents lateral falling of a person's head.

The device above where the head support member substantially prevents forward falling of a person's head.

The device above further including at least one of the first column, second column, shoulder roll, backing, head support member, first support member, and second support member further includes a cover containing at least one of fill, gel, one or more bladders, and air.

The device above where the frame, the shoulder roll, and the head support member are sized to accommodate at least one of an infant, a toddler, and a child.

A device including a frame including a first column, where the first column is positioned vertically; a first guide coupled to the first column, where the first guide extends along at least a portion of the length of the first column; a shoulder roll coupled to the frame via the first column, where the shoulder roll is perpendicular to the first column, where the shoulder roll further includes a backing that couples to the first guide such that the backing can move vertically along the first guide; and a head support member coupled to the frame in a position above the frame and above the shoulder roll, where the head support member includes a first support member to substantially prevent lateral motion of a person's head in a first direction and a second support member to substantially prevent lateral motion of the person's head in a second direction.

The device above where the head support member is in the shape of at least one of a semicircle, a U, a V, and a partial cylinder.

The device above where the head support member substantially prevents lateral falling of a person's head.

The device above where the head support member substantially prevents forward falling of a person's head.

The device above further including at least one of the first column, shoulder roll, backing, head support member, first support member, and second support member further includes a cover containing at least one of fill, gel, one or more bladders, and air.

The device above where the frame, the shoulder roll, and the head support member are sized to accommodate at least one of an infant, a toddler, and a child.

A device including a child car seat including a head support member, a backrest, and a seat, where the head support member is coupled to the backrest in a position above the backrest and where the head support member includes a first support member to substantially prevent lateral motion of a person's head in a first direction and a second support member to substantially prevent lateral motion of the person's head in a second direction, where the backrest includes a back portion and at least one side portion to support at least a portion of a child's upper body, where the backrest is coupled to the seat in a position above the seat, and where the seat includes a bottom portion to support at least a portion of the child's lower body.

The device above where the head support member is in the shape of at least one of a semicircle, a U, a V, and a partial cylinder.

The device above where the head support member substantially prevents lateral falling of a person's head.

The device above where the head support member substantially prevents forward falling of a person's head.

The device above further including at least one of the head support member, first support member, second support member, backrest, back portion, side portion, seat, and bottom portion further includes a cover containing at least one of fill, gel, one or more bladders, and air.

The device above where the back portion is a shoulder roll in the shape of at least one of a partial cylinder, a cylinder, a triangle, a semicircle, and a rectangle.

The device above where the head support member, the backrest, and the seat are sized to accommodate at least one of an infant, a toddler, and a child.

A device including a shoulder roll having a backing that couples to a first guide such that the backing can move vertically along the first guide; a head support member releasably connected to the guide in a position above the shoulder roll, where the head support member includes a first support member to substantially prevent lateral motion of a person's head in a first direction and a second support member to substantially prevent lateral motion of the person's head in a second direction; and a base having a bottom roll to support the bottom of a child, where the base is releasably connected to the first guide so that the shoulder roll is positioned a distance above the base that is commensurate with the length of a child's body from the child's shoulder to the child's bottom.

An infant seat insert positions an infant in an infant seat so that the infant's airway is not compromised. Two side rolls and a base roll fill the excess space in the seat, keeping the infant from slouching or shifting sideways. An adjustable shoulder roll rests behind the infant's shoulders to prevent the infant's head from driving its chin toward its chest and restricting the airway. The rolls are attached to a U-shaped frame which maintains the shape of the insert. The frame may be bent to provide adjustment of the resting angle of the insert. A support bar may attach to the frame near where the frame is bent and extend between the side rolls to help maintain the shape of the insert. The insert can be used in car seats, strollers, joggers, infant swings, and other seats having varying degrees of incline, and may also be used in a flat position, such as on a changing table.

An insert for protecting the breathing airway of an infant conforms to the incline angle of an infant seat, such as a car seat, high chair, stroller, or jogger. Preferably the insert is hinged so it can be used in an infant seat or laid flat for use on a changing table or other flat surface. In use, two side rolls contact the infant to prevent it from moving sideways. A bottom roll prevents slouching in the seat and supports the infant's legs when laid flat. Preferably, the bottom roll is removable so the insert may be used with larger infants who do not need the provided support. An adjustable shoulder roll extends between the side rolls and can be moved up or down for proper placement behind the infant's shoulders. The shoulder roll compensates for the infant's rearward-elongated head, keeping it in a natural position to avoid compromising the airway. The rolls are preferably made of memory foam and covered by machine-washable fabric.

DETAILED DESCRIPTION OF THE INVENTION

Figure 1:
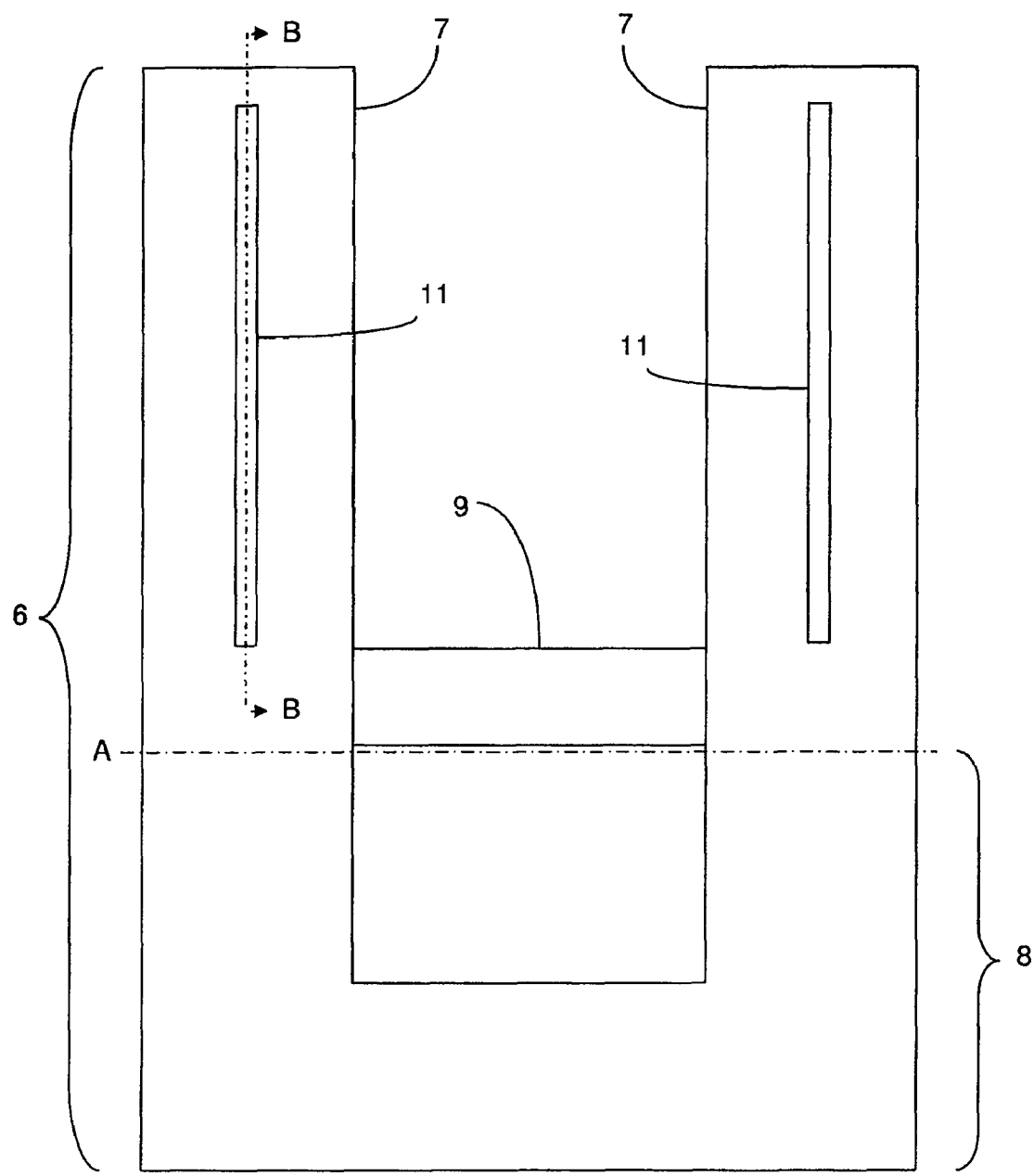
FIG. 1 is a rear view of the frame laid flat.
Figure 2A:
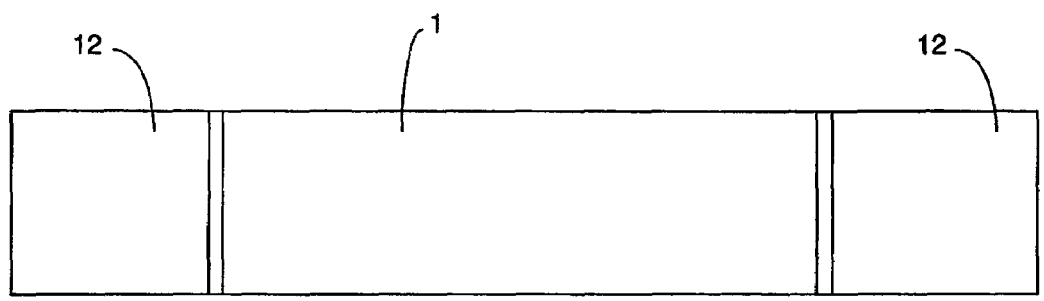
FIG. 2a is a front view of the shoulder roll and backing.
Figure 2B:
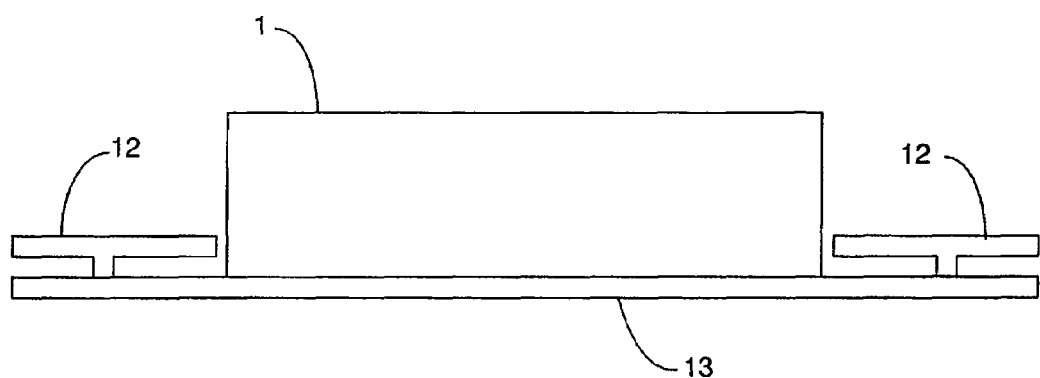
FIG. 2b is a top view of the shoulder roll and backing.
Figure 3A:
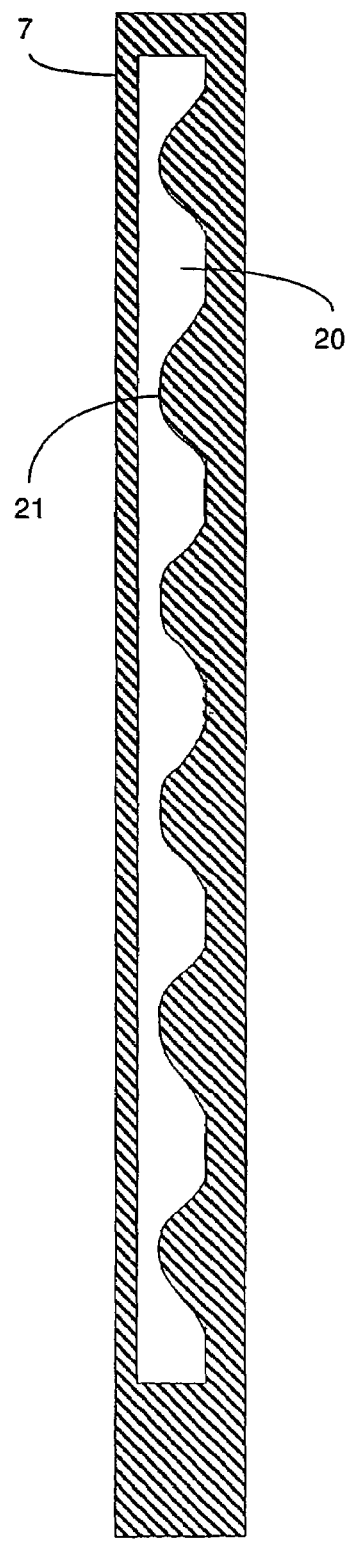
FIG. 3a is a section view of the preferred embodiment of a column, taken along line B-B in FIG. 1.
Figure 3B:
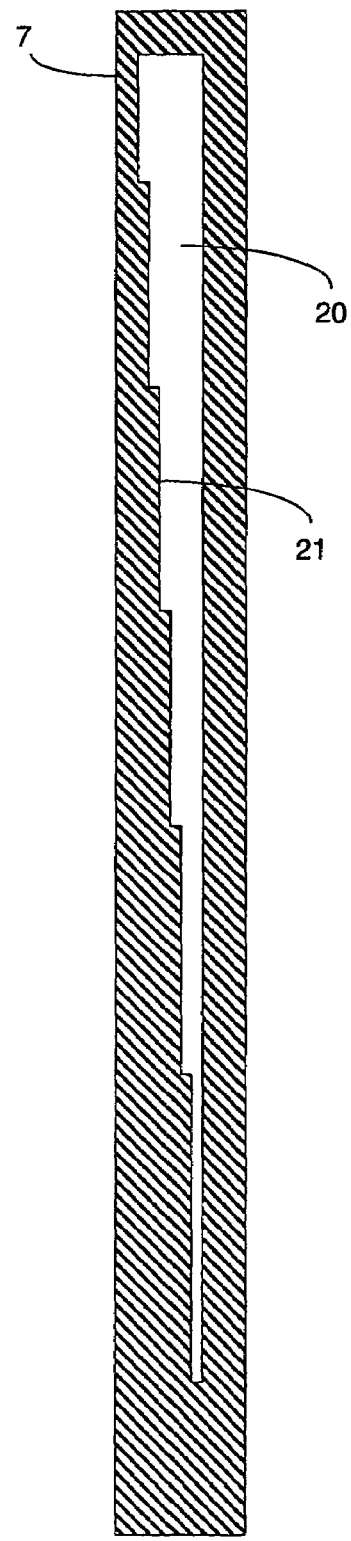
FIG. 3b is a section view of an alternate embodiment of a column, taken along line B-B in FIG. 1.
Figure 4:
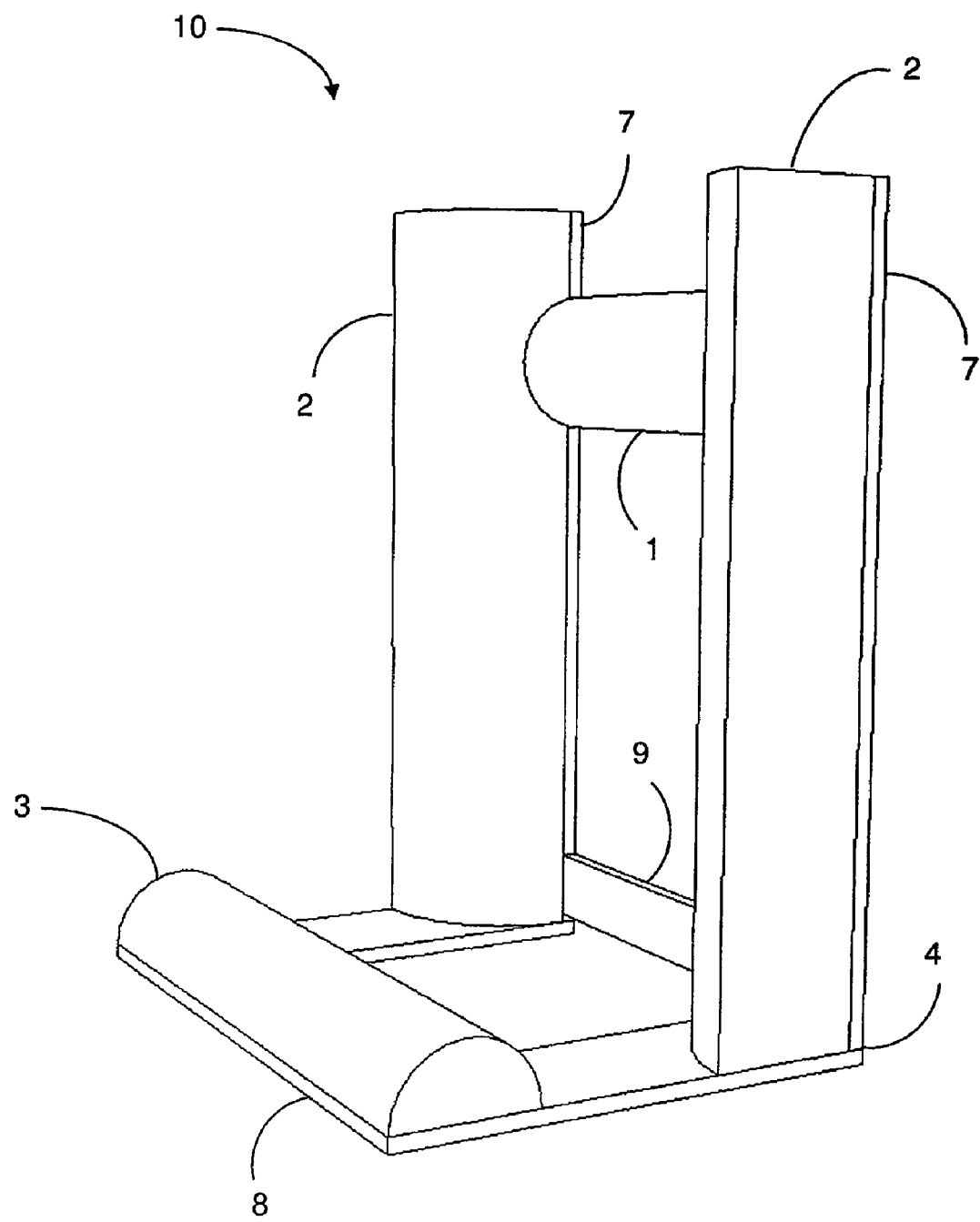
FIG. 4 is a perspective view of the preferred embodiment of the insert showing the front and right sides.
Figure 5:
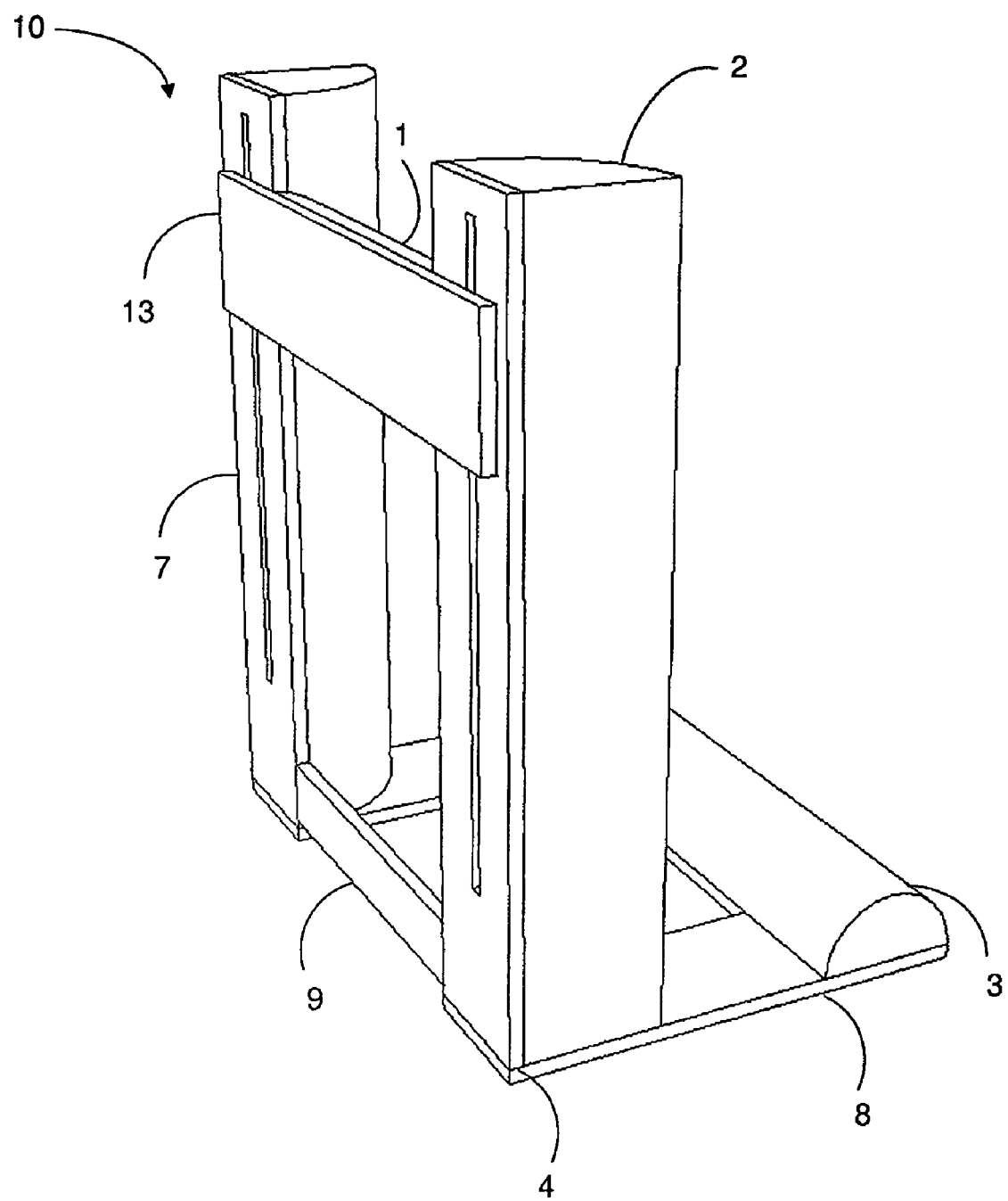
FIG. 5 is a perspective view of the preferred embodiment of the insert showing the back and left sides.
Figure 6:
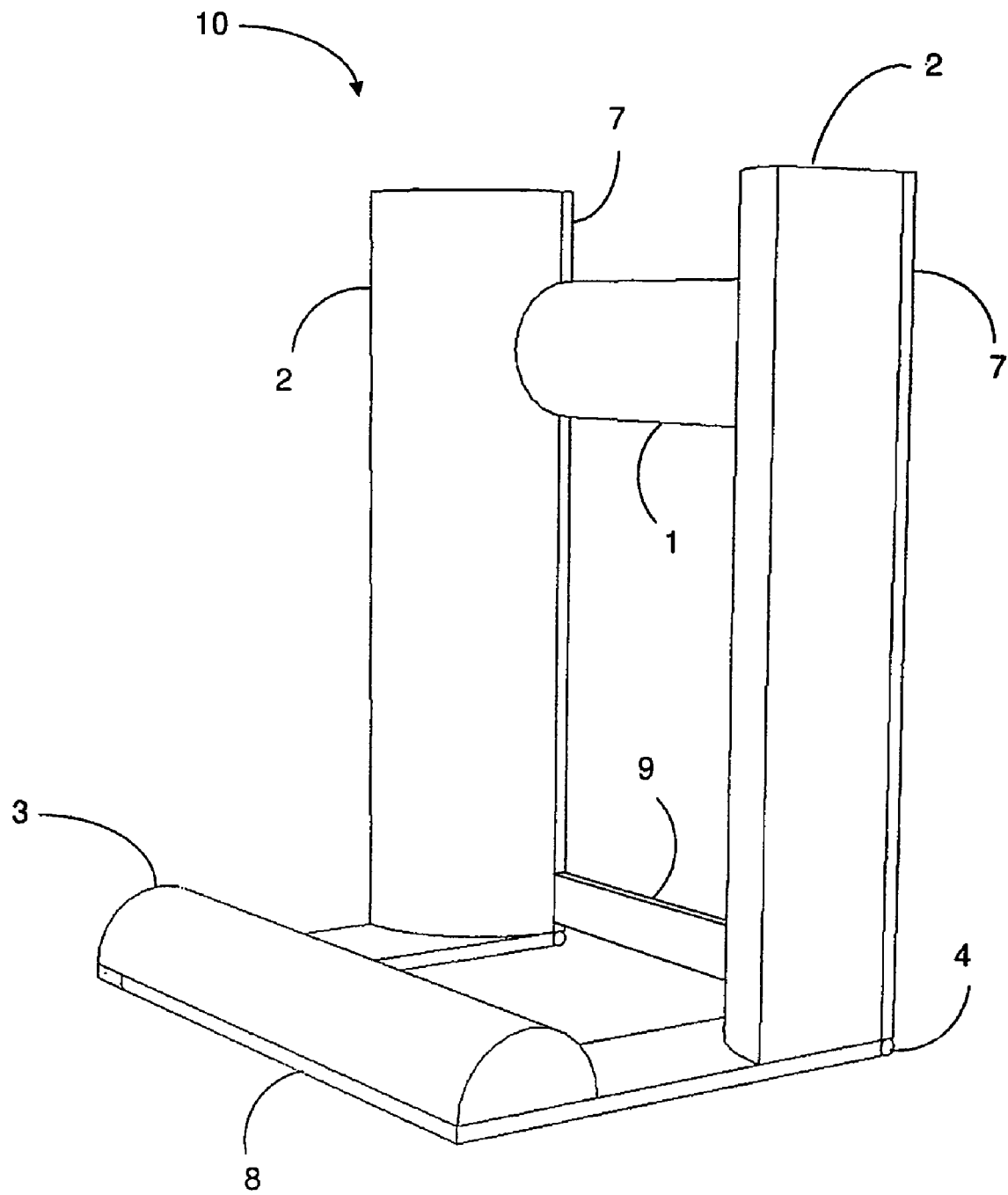
FIG. 6 is a perspective view of an alternate embodiment of the insert showing the front and right sides.
Figure 7:
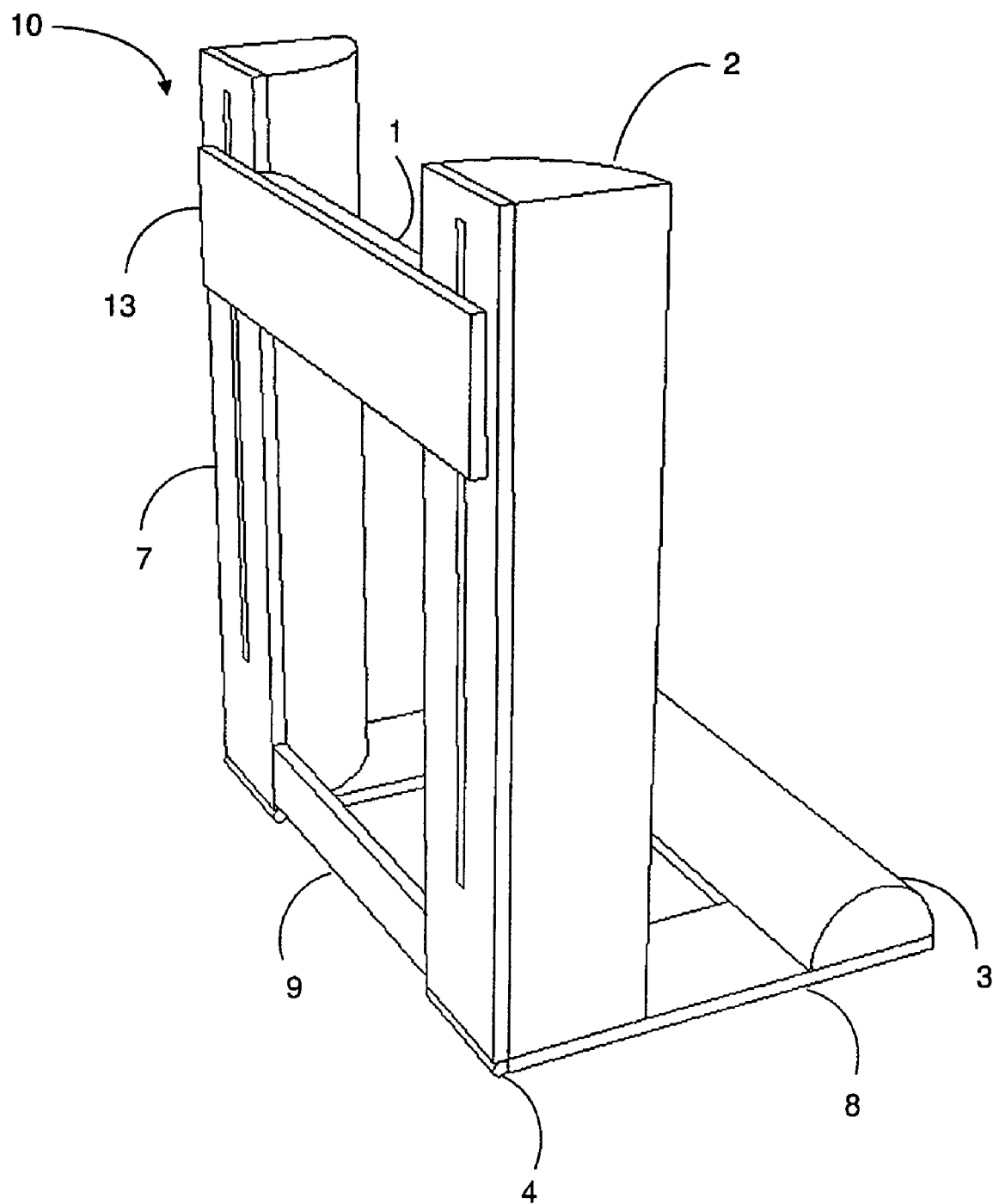
FIG. 7 is a perspective view of an alternate embodiment of the insert showing the back and left sides.

FIGS. 1-7 and 10-12 illustrate the present invention, designated generally as 10, which is used to position an infant in an infant seat where excess space in the infant seat poses the danger of compromising the infant's breathing airway. Referring to FIG. 1, a frame 6 is U-shaped and forms the core of the insert 10. The frame 6 may be any non-toxic and inexpensive material, such as rubber, medium-density fibreboard, cardboard, vinyl, polyvinyl chloride, or other polymers. The frame 6 may be rigid or flexible, but is preferably flexible to best conform to the surface on which it is placed. Preferably, the frame 6 is a single, planar piece made of rubber, which comprises two columns 7 and a base 8. The frame 6 may be sufficiently flexible that a natural bend occurs where the columns 7 meet the base 8, shown by line A in FIG. 1, allowing the insert 10 to lay flat or to bend to conform to the incline angle of any seat. When flat, the columns 7 and base 8 are substantially coplanar. When inclined, the columns 7 may be adjusted independently of each other, but once positioned in the infant seat the columns 7 are preferably substantially coplanar. The columns 7 and base 8 are attached to each other, wherein throughout this application attached means operably connected to each other, either integrally or in pieces, either permanently or removeably. The columns 7 and base 8 may also be physically separable at line A and permanently or removably rejoined by an attachment structure 4. Preferably, the attachment structure 4 is Velcro®, allowing the base 8 to be easily removed from the columns 7. In an alternate embodiment, shown in FIGS. 6 and 7, the attachment structure 4 is a set of hinges. Alternatively, if a flat-laying insert 10 is not desired, the frame 6 may be initially shaped in a rigid incline shape for placement in specific infant seats. For example, the frame 6 may be cast so the columns 7 and base 8 are defined by a 90 degree angle integral with the frame 6, so the insert 10 may be used in a straight-backed high chair.

A bottom roll 3 is attached to the base 8. The bottom roll 3 may be any shape that will support the infant, but is preferably a half cylinder. Preferably, the bottom roll 3 and base 8 are removably attached to the columns 7 so the insert 10 can be used for infants who do not need the support provided by the bottom roll 3. At least one side roll 2 is attached to each column 7. Preferably, a single side roll 2 is attached to each column and is the same width as the column 7 and is parallel to the column 7. Each side roll is preferably straight for ease of manufacturing, but may also be curved to resemble the contours of the infant's body. Alternatively, multiple side rolls 2 may be attached to the column 7 and may be varying widths to approximate the contours of the infant's body. For example, the side rolls 2 at the tops of the columns 7 may be wide enough to contact the sides of the infant's head. The side rolls 2 may be any shape that will support the infant, but preferably form one-quarter of a cylinder so that the surfaces of the side rolls 2 which contact the infant seat may best conform to the interior corners of the infant seat. The side rolls 2 and bottom roll 3 comprise a filler material such as cotton fill, memory foam, polyester fill, down fill, open- or closed-cell foam, or other materials that are preferably non-toxic and comfortable. Preferably, the side rolls 2 and bottom roll 3 are memory foam. The side rolls 2 and bottom roll 3 also comprise a fabric cover which encases the filler material and also stretches around the frame 6, attaching the side rolls 2 and bottom roll 3 to the frame 6. Alternatively, the fabric cover may encase the filler material and then be attached to the frame 6 by an adhesive, such as glue, or a nonadhesive, such as staples, buttons, or hook-and-loop attachments such as Velcro®. The fabric cover may be any non-toxic and comfortable material, such as cotton, polyester, denim, velour, or a blend of materials. The fabric is preferably polyester. The fabric is preferably machine-washable but may also be dry-clean only.

A shoulder roll 1 is oriented perpendicularly to the columns 7, stretching between the side rolls 2. The shoulder roll 1 may be any shape that will support the infant, but is preferably a half cylinder. The shoulder roll 1 is preferably straight, but may be arched or rounded to support the infant's neck as well as its shoulders. The shoulder roll 1 preferably comprises the same material as the side and back rolls 2 and 3. The shoulder roll 1 is attached to its own backing 13 which is separate from the frame 6 but is preferably made of the same material as the frame 6. The backing 13 attaches to the frame 6 via two guides 11 on the back of the columns 7. See FIG. 2b. The attachment between the backing 13 and the guides 11 allows the shoulder roll 1 to glide up and down the columns 7 so that the shoulder roll 1 may be properly positioned behind the infant's shoulders. The guides 11 may be inset into the columns 7 or may extend outward from the columns 7, and may be integral with the columns 7 or may be separate pieces adhered to the columns 7. In the preferred embodiment, the backing 13 comprises two anchors 12 and the 11 are slots integrated into the columns 7. See FIGS. 2a and 2b. The slots allow access to the interior of each column 7, which is at least partially hollow to create a cavity 20 large enough to accept an anchor 12 inserted through the slot 11. The backing 13 is thereby anchored to the columns 7. In the preferred embodiment, the interior of the column 7 includes a series of elevations 21 which protrude into the cavity 20 to impede the gliding motion of the backing 13. In the preferred embodiment, shown in FIG. 3a, the elevations 21 are spaced at regular intervals and protrude into the cavity 21, narrowing the cavity 21 to a point that the anchors 12 cannot move past an elevation 21 unless a pushing or pulling force is applied to the shoulder roll 1. The elevations 21 may be rounded, rectangular, triangular, or other shapes, but are preferably rounded. In an alternate embodiment, shown in FIG. 3b, the elevations 21 protrude into the cavity 20 in a stepping configuration. The backing 13 glides up or down until the anchors 12 meet an elevation 21. To move the backing 13 further down the columns 7, a user pulls the backing 13 forward to release the anchors 12 from the current elevation 21, then slides the backing 13 downward.

A support bar 9 may be included to improve the integrity of the insert 10 once it is placed in the infant seat. The support bar 9 attaches to each column 7 near line A, extending between the columns. The support bar 9 is rigid in order to stabilize the columns 7 in the infant seat by keeping the columns 7 a set distance apart and preventing their bending or shifting into odd angles. The support bar 9 is preferably plastic, but may also be the same material as the frame 6. The support bar 9 is preferably covered in fabric like the rolls.

Figure 8:
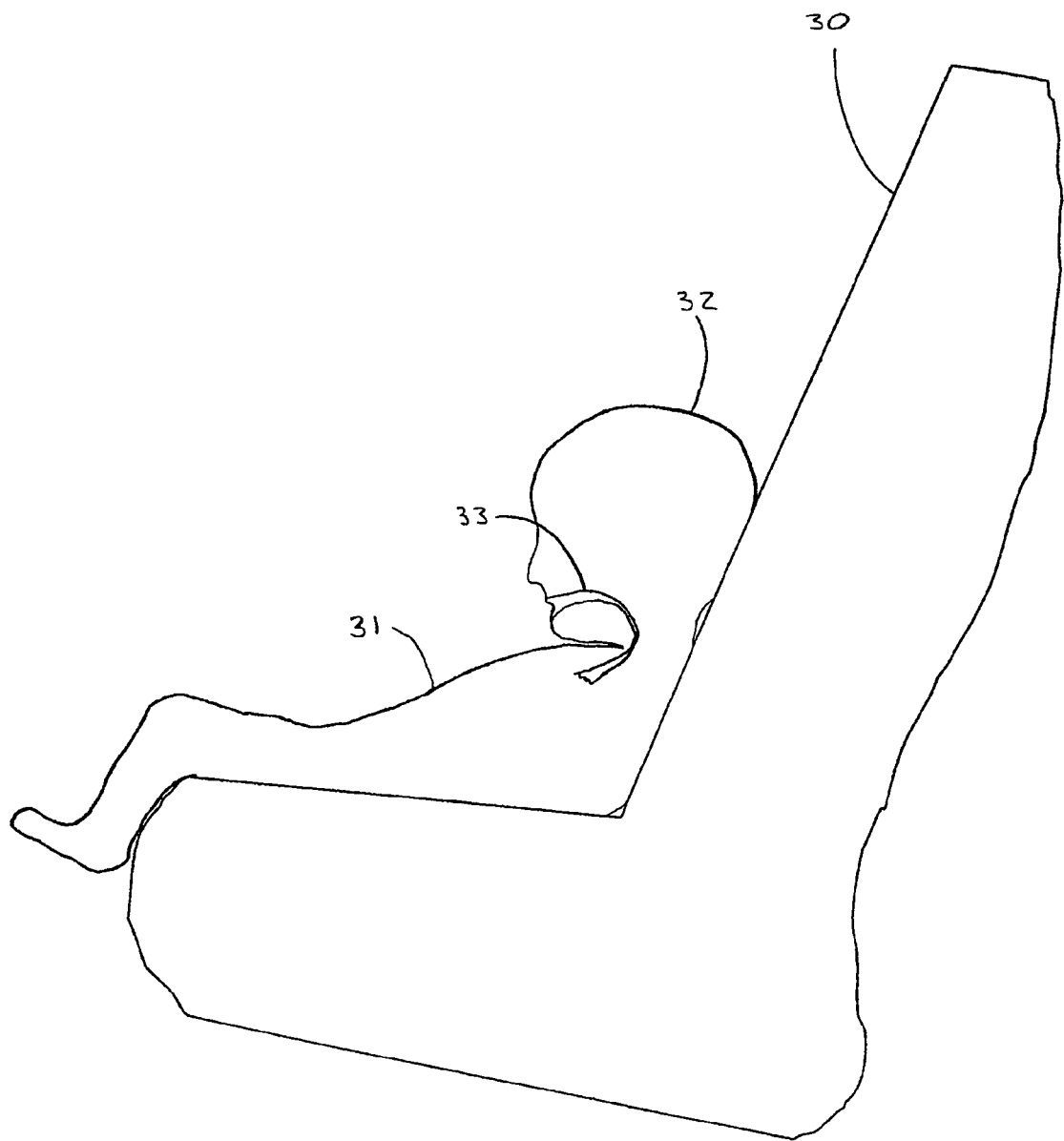
FIG. 8 is a right-side view of a small infant in a car seat without the insert.
Figure 9:
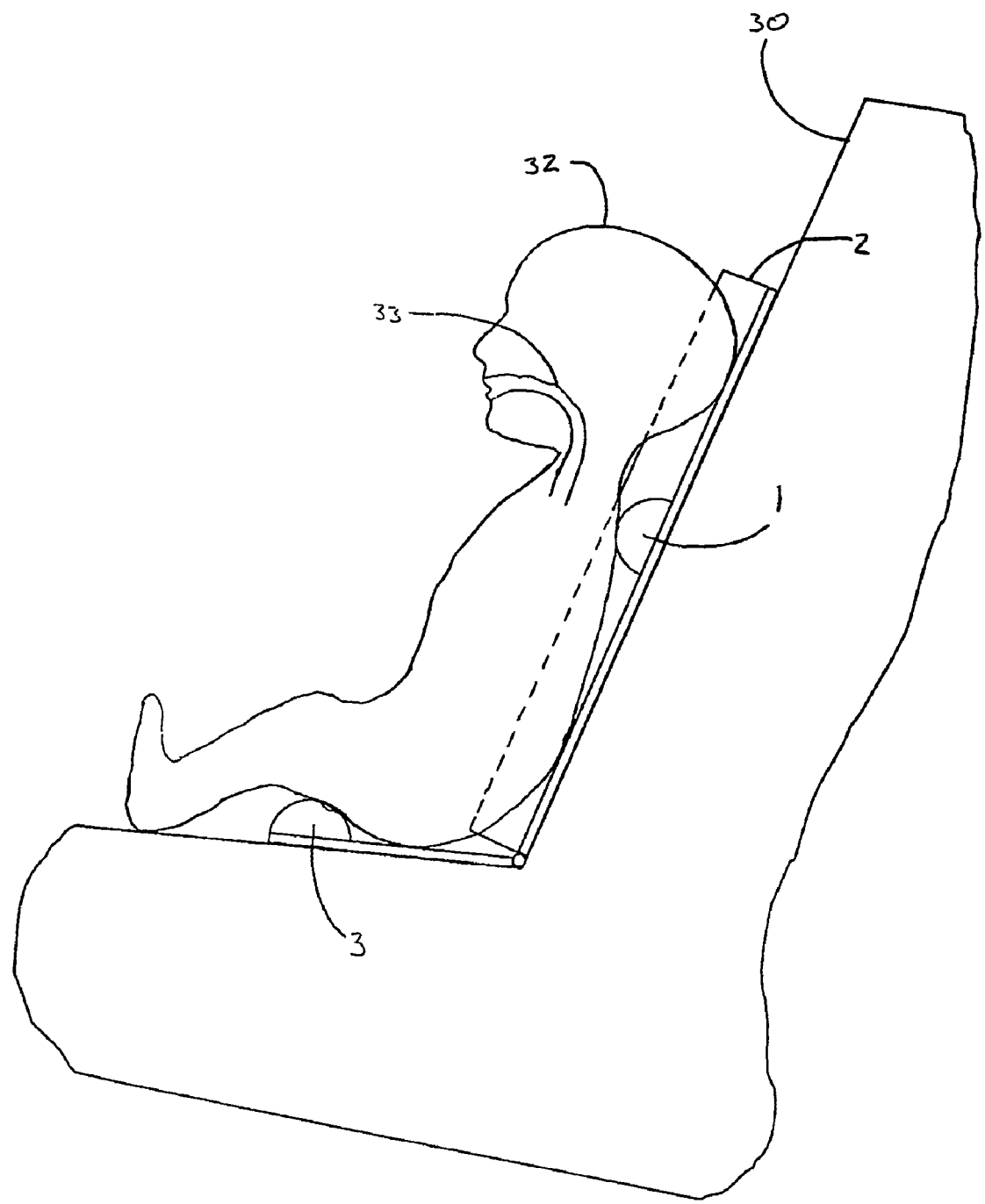
FIG. 9 is a right-side view of a small infant in a car seat with the insert.

Referring to FIG. 8, without the insert 10 in place in the infant seat 30, the infant 31 slouches and the back of the head 32 rests against the back of the infant seat 30, pushing the head 32 forward and restricting the airway 33. When the insert 10 is placed in the infant seat, the columns 7 and base 8 may be adjusted to conform to the incline angle of the infant seat. See FIG. 9. The insert 10 may be held in place by the weight of the infant, by restraints built into the infant seat, or by an additional attachment mechanism such as a series of buttons that mate with buttons on the infant seat. The bottom roll 3 is positioned under the infant's 31 buttocks or upper legs to prevent the infant 31 from slouching in the infant seat 30. The infant's 31 upper body rests against the side rolls 2. The infant 31 is thus prevented from shifting to the left or right. The shoulder roll 1 is positioned behind the infant's 31 shoulders so that a natural position of the head 32 is maintained and the airway 33 remains clear. The insert 10 may also be laid flat, such as on a changing table, and the infant placed thereon with the shoulder roll positioned behind the infant's shoulders. The shoulder roll keeps the infant's head in a natural position and protects the airway, while the side rolls prevent the infant from rolling off the table.

Figure 10:
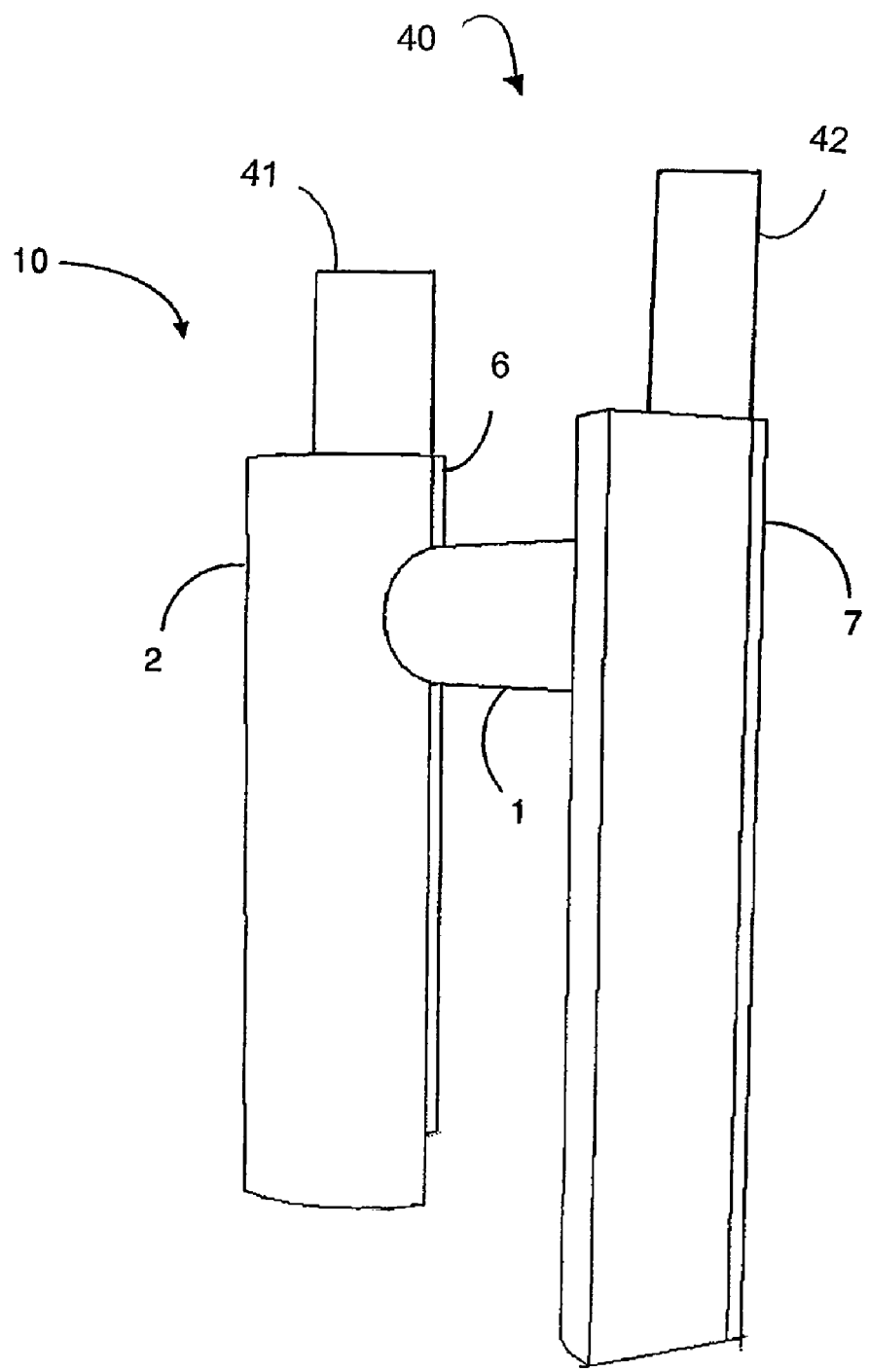
FIG. 10 is a perspective view of the preferred embodiment of the insert showing the front and right sides.

Referring to FIG. 10, the insert 10 includes two guides 11 (not shown) that extend along at least a portion of the length of each column 7. The backing 13 (not shown) of the shoulder roll 1 is coupled to the two guides 11 such that the backing 13 can move vertically along the two guides 11. For example, the backing 13 can be coupled to the two guides 11 using Velcro®, hinges, or any other connection. The insert 10 also includes a head support member 40 coupled to the frame 6 in a position above the frame 6 and above the shoulder roll 1, wherein the head support member 40 includes a first support member 41 to substantially prevent lateral motion of a person's head in a first direction and a second support member 42 to substantially prevent lateral motion of the person's head in a second direction. The head support member 40 can be separate or integrated into shoulder roll 1 (or vice versa).

Figure 11:
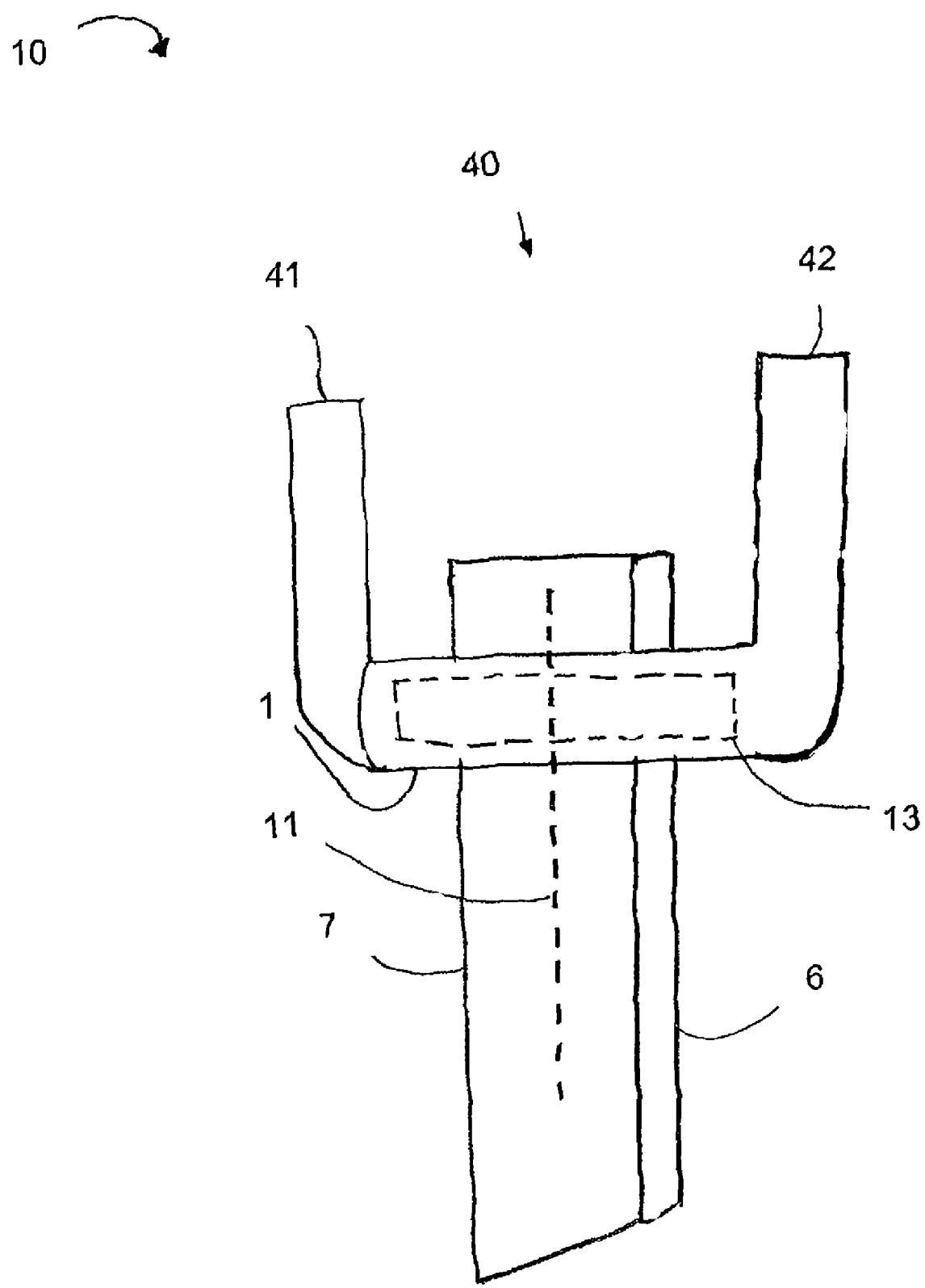
FIG. 11 is a perspective view of the preferred embodiment of the insert showing the front right side.

Referring to FIG. 11, the insert 10 includes the frame 6 having one column 7, where the column 7 is positioned vertically. One guide 11 is coupled to the column 7, so that the guide 11 extends along at least a portion of the length of the column 7. The shoulder roll 1 is coupled to the frame 6 via the column 7 and the shoulder roll 1 is perpendicular to the column 7. The shoulder roll 1 has the backing 13 that couples to the guide 11 such that the backing 13 can move vertically along the guide 11. The head support member 40 is coupled to the frame 6 in a position above the frame 6 and above the shoulder roll 1. The head support member 40 includes the first support member 41 to substantially prevent lateral motion of a person's head in a first direction and the second support member 42 to substantially prevent lateral motion of the person's head in a second direction.

Figure 12:
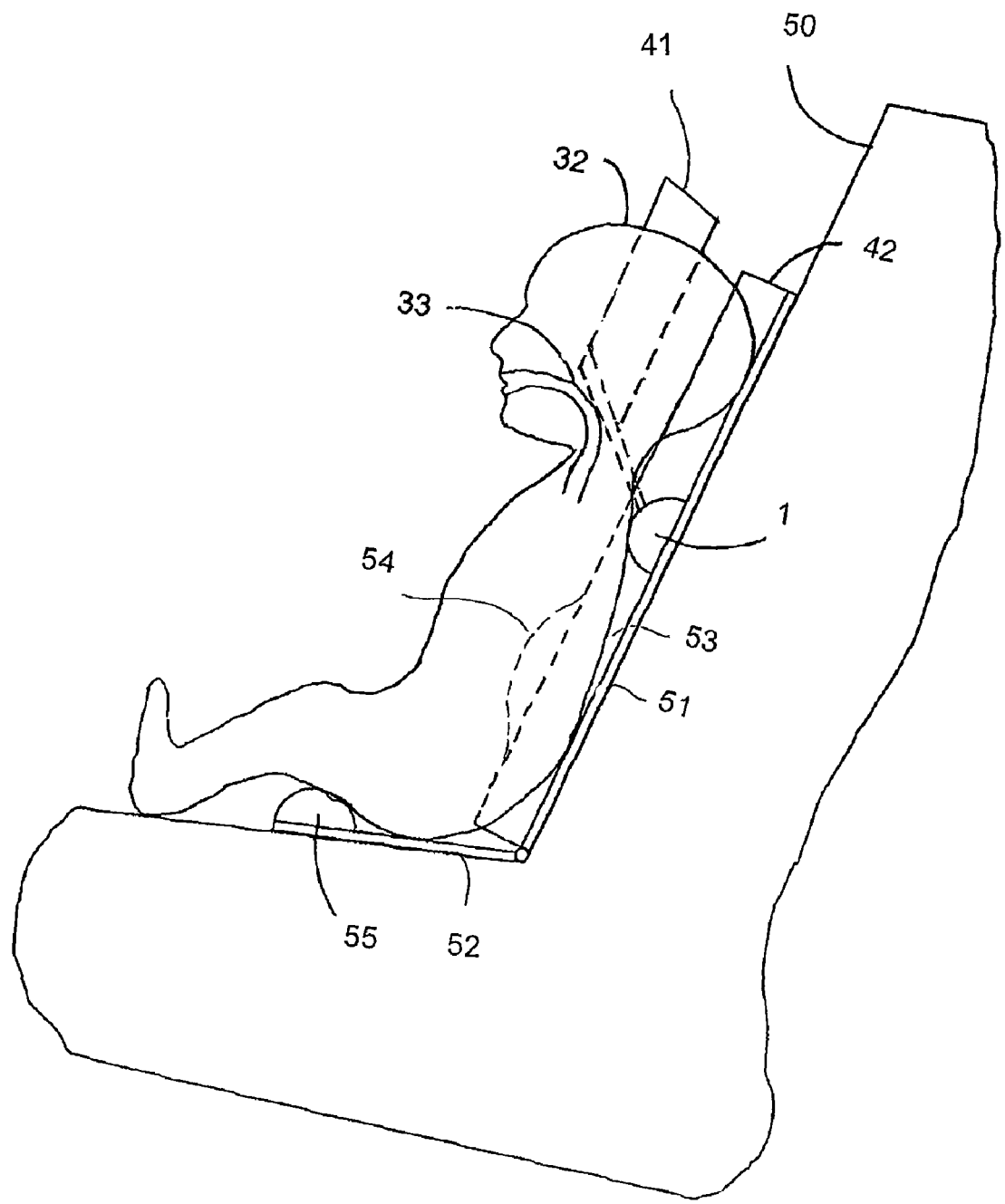
FIG. 12 is a right-side view of a child car seat with the insert.

Referring to FIG. 12, a child car seat 50 includes the head support member 40, a backrest 51, and a seat 52. The head support member 40 is coupled to the backrest 51 in a position above the backrest 51. The head support member 40 includes the first support member 41 to substantially prevent lateral motion of a person's head in a first direction and the second support member 42 to substantially prevent lateral motion of the person's head in a second direction. The backrest 51 includes a back portion 53 and at least one side portion 54 to support at least a portion of a child's upper body. The backrest 51 is coupled to the seat 52 in a position above the seat 52. The seat 52 includes a bottom portion 55 (such as the bottom roll 3) to support at least a portion of the child's lower body.

In FIGS. 10-12, the head support member 40 substantially prevents lateral falling of a person's head. The head support member 40 substantially prevents forward falling of a person's head. The head support member 40, first support member 41, and the second support member 42 can be individually or as a unit in the shape of at least one of a semicircle, a U, a V, and a partial cylinder. At least one of the columns 7, shoulder roll 1, backing 13, head support member 40, first support member 41, and second support member 42 can include a cover containing at least one of fill, gel, one or more bladders, and air. The frame 6, the shoulder roll 1, and the head support member 40 can be sized to accommodate at least one of an infant, a toddler, and a child.

Although some elements are not illustrated in FIGS. 10-12 (such as side roll 2, bottom roll 3, attachment structure 4, base 8, support bar 9, anchors 12, or any others), these elements could be added to each exemplary embodiment of the present invention.

Insert 10 of the present invention can be sized to be used for an infant, toddler, or child. For example, the infant can be from birth to 1 year of age. Considerations should be made for premature or term infants. It is recommended that the infant weigh a minimum of about 4 pounds. The infant or toddler can be up to about 30 inches in length (or height) and about 30 pounds in weight. The toddler or child can be up to about 49 inches in length (or height) and about 65 pounds in weight. The toddler or child is usually about 1 to 5 years old. These length or height and weight measurements can vary depending on varying sizes of infants, toddlers, and children.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention. For example, the steps recited in any method or process may be executed in any order and are not limited to the order presented in the method or process.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of the invention. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A device, comprising:
   a frame including a first column and a second column, wherein the first and second columns are positioned vertically;
   a first guide coupled to the first column and a second guide coupled to the second column, wherein the first and second guides extend along at least a portion of the length of each column, wherein the first guide is integrated into the first column and the second guide is integrated into the second column, wherein the first and second guides are slots providing access to a cavity in each column and the slots extend substantially along the entire length of each column, wherein the first column includes a series of elevations that protrude into the cavity inside the first column;
   a shoulder roll coupled to the frame via the first column and the second column, wherein the shoulder roll is perpendicular to the first column and the second column, wherein the shoulder roll is in the shape of a partial cylinder, wherein the shoulder roll further comprises a backing that couples to the first guide using a first anchor coupled to the series of elevations in the cavity of the first column and to the second guide using a second anchor such that the backing can move vertically along the first and second guides; and
   a head support member coupled to the frame in a position above the frame and above the shoulder roll, wherein the head support member includes a first support member to substantially prevent lateral motion of a person's head in a first direction and a second support member to substantially prevent lateral motion of the person's head in a second direction.

2. The device of claim 1, wherein the head support member is in the shape of at least one of a semicircle, a U, a V, and a partial cylinder.

3. The device of claim 1, wherein the head support member including the first support member and the second support member is configured in the shape of at least one of a semicircle, a U, a V, and a partial cylinder so that the head support member substantially prevents lateral falling of a person's head.

4. The device of claim 1, wherein the head support member including the first support member and the second support member is configured in the shape of at least one of a semicircle, a U, a V, and a partial cylinder and the positioning of the shoulder roll and the head support member substantially prevents forward falling of a person's head.

5. The device of claim 1, further comprising at least one of the first column, second column, shoulder roll, backing, head support member, first support member, and second support member further comprises a cover containing at least one of fill, gel, one or more bladders, and air.

6. The device of claim 1, wherein the frame, the shoulder roll, and the head support member are sized to accommodate at least one of an infant, a toddler, and a child.

7. A device, comprising:
   a frame including a first column, wherein the first column is positioned vertically;
   a first guide coupled to the first column, wherein the first guide extends along at least a portion of the length of the first column, wherein the first guide is integrated into the first column, wherein the first guide is a slot providing access to a cavity in the first column and the slot extend substantially along the entire length of the first column, wherein the first column includes a series of elevations that protrude into a cavity inside the first column;

a shoulder roll coupled to the frame via the first column, wherein the shoulder roll is perpendicular to the first column, wherein the shoulder roll is in the shape of a partial cylinder, wherein the shoulder roll further comprises a backing that couples to the first guide using a first anchor coupled to the series of elevations in the cavity of the first column such that the backing can move vertically along the first guide; and a head support member coupled to the frame in a position above the frame and above the shoulder roll, wherein the head support member includes a first support member to substantially prevent lateral motion of a person's head in a first direction and a second support member to substantially prevent lateral motion of the person's head in a second direction.

8. The device of claim 7, wherein the head support member is in the shape of at least one of a semicircle, a U, a V, and a partial cylinder.

9. The device of claim 7, wherein the head support member including the first support member and the second support member is configured in the shape of at least one of a semicircle, a U, a V, and a partial cylinder so that the head support member substantially prevents lateral falling of a person's head.

10. The device of claim 7, wherein the head support member including the first support member and the second support member is configured in the shape of at least one of a semicircle, a U, a V, and a partial cylinder and the positioning of the shoulder roll and the head support member substantially prevents forward falling of a person's head.

11. The device of claim 7, further comprising at least one of the first column, shoulder roll, backing, head support member, first support member, and second support member further comprises a cover containing at least one of fill, gel, one or more bladders, and air.

12. The device of claim 7, wherein the frame, the shoulder roll, and the head support member are sized to accommodate at least one of an infant, a toddler, and a child.

13. A device, comprising:
a child car seat including a head support member, a backrest, and a seat,
wherein the head support member is configured to be coupled to the backrest in a position above the backrest and wherein the head support member includes a first support member to substantially prevent lateral motion of a person's head in a first direction and a second support member to substantially prevent lateral motion of the person's head in a second direction,
wherein the backrest includes a back portion, a first column, and a second column to support at least a portion of a child's upper body, wherein the first and second columns are positioned vertically,
a first guide coupled to the first column and a second guide coupled to the second column, wherein the first and second guides extend along at least a portion of the length of each column, wherein the first guide is integrated into the first column and the second guide is integrated into the second column, wherein the first and second guides are slots providing access to a cavity in each column and the slots extend substantially along the entire length of each column, wherein the first column includes a series of elevations that protrude into the cavity inside the first column,
a shoulder roll coupled to the backrest via the first column and the second column, wherein the shoulder roll is perpendicular to the first column and the second column, wherein the shoulder roll is in the shape of a partial cylinder, wherein the shoulder roll couples to the first guide using a first anchor coupled to the series of elevations in the cavity of the first column and to the second guide using a second anchor via the backrest such that the shoulder roll can move vertically along the first and second guides,
wherein the backrest is coupled to the seat in a position above the seat, and
wherein the seat includes a bottom portion to support at least a portion of the child's lower body.

14. The device of claim 13, wherein the head support member is in the shape of at least one of a semicircle, a U, a V, and a partial cylinder.

15. The device of claim 13, wherein the head support member including the first support member and the second support member is configured in the shape of at least one of a semicircle, a U, a V, and a partial cylinder so that the head support member substantially prevents lateral falling of a person's head.

16. The device of claim 13, wherein the head support member including the first support member and the second support member is configured in the shape of at least one of a semicircle, a U, a V, and a partial cylinder and the positioning of the shoulder roll and the head support member substantially prevents forward falling of a person's head.

17. The device of claim 13, further comprising at least one of the head support member, first support member, second support member, backrest, back portion, side portion, seat, and bottom portion further comprises a cover containing at least one of fill, gel, one or more bladders, and air.

18. The device of claim 13, wherein the back portion is in the shape of at least one of a partial cylinder, a cylinder, a triangle, a semicircle, and a rectangle.

19. The device of claim 13, wherein the head support member, the backrest, and the seat are sized to accommodate at least one of an infant, a toddler, and a child.

20. A device, comprising:
a shoulder roll having a backing that couples to a first guide such that the backing can move vertically along the first guide, wherein the shoulder roll is in the shape of a partial cylinder, wherein the first guide is coupled to a first column and the first guide extends along at least a portion of the length of the first column, wherein the first guide is integrated into the first column, wherein the first guide is a slot providing access to a cavity in the first column and the slot extends substantially along the entire length of the first column, wherein the first column includes a series of elevations that protrude into the cavity inside the first column, wherein the shoulder roll couples to the first guide using a first anchor coupled to the series of elevations in the cavity of the first column;
a head support member releasably connected to the guide in a position above the shoulder roll and perpendicular to the shoulder roll, wherein the head support member includes a first support member to substantially prevent lateral motion of a person's head in a first direction and a second support member to substantially prevent lateral motion of the person's head in a second direction; and
a base having a bottom roll to support the bottom of a child, wherein the base is releasably connected to the first guide so that the shoulder roll is positioned a distance above the base that is commensurate with the length of a child's body from the child's shoulder to the child's bottom.

* * * * *